United States Patent
Kuder et al.

Patent Number: 6,015,524
Date of Patent: *Jan. 18, 2000

[54] ADHESIVES FOR MAKING MULTILAYER FILMS COMPRISING LIQUID CRYSTALLINE POLYMERS AND POLYETHYLENE

[75] Inventors: James E. Kuder, Fanwood; Dominick Cangiano, Neshanic; Vincent J. Provino, Clifton; Wayne Xu, Lake-Hiawatha, all of N.J.

[73] Assignee: Hoechst Celanese Corporation, Warren, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/954,377

[22] Filed: Oct. 20, 1997

[51] Int. Cl.⁷ .................................................... B29C 47/06
[52] U.S. Cl. ............... 264/173.12; 156/228; 156/244.11; 156/332; 156/334; 264/173.14; 264/261
[58] Field of Search ................. 264/173.12, 173.14, 264/261; 156/228, 244.11, 332, 334

[56] References Cited

U.S. PATENT DOCUMENTS

| | | | |
|---|---|---|---|
| 4,473,682 | 9/1984 | Calundann et al. | 524/605 |
| 5,204,443 | 4/1993 | Lee et al. | 528/184 |
| 5,227,456 | 7/1993 | Shepherd et al. | 528/173 |
| 5,405,565 | 4/1995 | Sumida et al. | 264/173.14 |
| 5,512,625 | 4/1996 | Butterbach et al. | 524/490 |
| 5,656,714 | 8/1997 | Shen et al. | 528/193 |
| 5,738,918 | 4/1998 | Shen et al. | 428/1 |
| 5,744,204 | 4/1998 | Jester | 428/1 |
| 5,863,622 | 1/1999 | Jester | 428/1 |

FOREIGN PATENT DOCUMENTS

| | | |
|---|---|---|
| 763 423 | 3/1997 | European Pat. Off. . |
| WO 92/18568 | 10/1992 | WIPO . |
| WO 93/24574 | 12/1993 | WIPO . |
| WO 95/23180 | 8/1995 | WIPO . |
| WO 96/00752 | 1/1996 | WIPO . |
| WO 97/47467 | 12/1997 | WIPO . |

OTHER PUBLICATIONS

Translation of Japan 2–253,950 (Oct. 12, 1990).
Translation of Japan 2–253,951 (Oct. 12, 1990).
Abstract of Japan 2–253,950 (Oct. 12, 1990).
Abstract of Japan 2–253,951 (Oct. 12, 1990).
Abstract of Japan 2–307,751 (Dec. 20, 1990).
Abstract of Japan 4–135,750 (May 11, 1992).

*Primary Examiner*—Leo B. Tentoni

[57] ABSTRACT

Multilayer films that include a thermotropic liquid crystalline polymer film layer and a polyethylene film layer are bound together using one of the following hot melt adhesives: ethylene-glycidyl methacrylate copolymer, ethylene-methyl acrylate-glycidyl methacrylate terpolymer, ethylene vinyl acetate copolymer, a polyolefin blend, ethylene-acrylic acid copolymer, and mixtures thereof.

13 Claims, No Drawings

ADHESIVES FOR MAKING MULTILAYER FILMS COMPRISING LIQUID CRYSTALLINE POLYMERS AND POLYETHYLENE

RELATED APPLICATIONS

The following four copending applications filed on even date herewith, all contain related subject matter: U.S. application Ser. Nos. 08/954,378, 08/954,379, 08/954,997, and 08/955,000.

FIELD OF THE INVENTION

This invention relates to multilayer films, and more specifically to multilayer films that include a liquid crystalline polymer film and a polyethylene film.

BACKGROUND OF THE INVENTION

Liquid crystalline polymer (LCP) films have properties that are very is desirable, such as excellent chemical resistance, high strength, and excellent gas barrier properties. However, these same films have certain undesirable properties. They often have poor transverse mechanical properties (i.e. they are strong in the machine direction, but tear easily in the direction transverse to the machine direction). It is also difficult to write or print on the films. LCP films are more expensive than conventional polymer films, such as polyester films.

It would be desirable to make multilayer films having LCP film bonded to one or more other films to obtain a film having the best properties of all of the various layers, such as a multilayer film having good gas barrier properties and relatively low cost.

However, LCP films do not bond well to each other or to other films by use of an adhesive. Their surfaces do not in general adhere to adhesives. There are thus very few examples of multilayer films containing one or more LCP layers. One example can be found in Japanese Patent Application No. 02-253,950, published in 1990, where a poly (butylene terephthalate) film layer is bound to VECTRA® A 900 LCP film using a glycidyl-modified ethylene vinyl acetate adhesive. The other side of the VECTRA film is bound to polypropylene film by using two adhesive layers, a glycidyl-modified ethylene vinyl acetate layer in contact with the LCP and an ethyl acrylate-ethylene-maleic anhydride copolymer in contact with the polypropylene. Japanese Patent publications 02-253,951 (1990) and 04-135,750 (1992) use similar adhesives for binding an LCP to poly (butylene terephthalate) and polypropylene. The latter of these patent applications also uses a saponified ethylene-vinyl acetate copolymer as an adhesive. Other publications that discuss multilayer films comprising an LCP barrier layer include Japanese Patent Publication 02-307,751 (1990), PCT Patent Publication WO 95/23180, and European Patent Application No. 763,423.

SUMMARY OF THE INVENTION

Adhesives have now been identified that bind LCP films having several different compositions to polyethylene. These adhesives are all hot melt adhesives, and are listed below:

(1) Ethylene-glycidyl methacrylate copolymer;
(2) Ethylene-methyl acrylate-glycidyl methacrylate terpolymer;
(3) Ethylene-vinyl acetate copolymer having a vinyl acetate monomer unit content of greater than 9 mole %, preferably greater than 11%; a melt viscosity of at least 1000 poise at 1000 sec$^{-1}$ and 200° C.; preferably at least 1500 poise under the same conditions; and a melting point of at least 60° C., preferably at least 75° C.;
(4) Ethylene-acrylic acid copolymer; and
(5) A polyolefin blend, which is a mixture of poly($\alpha$-olefins), comprised mainly of isotactic polypropylene and a polymer of a second lower $\alpha$-olefin, with small amounts of higher poly($\alpha$-olefins).

A blend of this with high density polyethylene (HDPE) also is a good adhesive for polyethylene/LCP films, and has a higher melt viscosity than the polyolefin blend alone.

Multilayer films are made by heating the two films that are being bonded together to a temperature above the melting points of both polymers and of the hot melt adhesive, under a compressive force to form laminated structures, or by coextruding the molten polymers, including the adhesive, through a die slit to form multilayer structures.

The adhesives described above also turn out to be compatibilizers for blends of the LCP and polyethylene. The blends are made by extruding the LCP, polyethylene, and the adhesive/compatibilizer in the molten phase through an extruder under mixing conditions.

The words "films" and "sheets" and "films and sheets" are all used herein to describe thin flexible plastic fabricated structures. These generally have a thickness in the range of about 0.01 mm (0.4 mils) to about 10 mm (400 mils). This range of thicknesses is wide enough to encompass the common meaning of both films (<0.25 mm) and sheets (thicker than films), and the words "films" and "sheets" therefore are used interchangeably to describe something that may be described either as a film or sheet. The layers in coextruded films and sheets will likewise have the same broad range of thicknesses described above (i.e. about 0.01 mm to about 10 mm). The laminated and coextruded structures will be thicker since they are made up of several layers or films. Finally, "multilayer" sheets and films includes both laminated sheets and films and coextruded sheets and films. Laminated sheets and films are made by laminating sheets and films together. Coextruded sheets and films are made by coextruding the polymers through the die of an extruder in such a way that a multilayer film or sheet is formed. Multilayer films are also sometimes referred to as "laminates," regardless of how they are made.

DETAILED DESCRIPTION OF THE INVENTION

Liquid crystalline polymers (LCP's) are well known in the art and are characterized as having a liquid crystalline phase above the temperature at which the polymers become molten. The liquid crystalline polymers used in the multilayer films described herein are generally all-aromatic polymers, with relatively linear structures, which exhibit liquid crystalline behavior in the molten phase. They are generally polyesters or poly(ester-amides), and generally comprise monomer units that include within their structures, exclusive of functional groups, one or more of the following aromatic nuclei: 1,4-phenylene, 1,3-phenylene, 4,4'-biphenylene, and 2,6- and/or 2,7-naphthylene. Some LCP's also contain monomer units that are derived from ethylene glycol. Preferred LCP's contain only aromatic monomer units.

Generally, the LCP's comprise monomer units derived from one or more of the following monomers and generally at least two of the following monomers: terephthalic acid, isophthalic acid, 1,4-hydroquinone, resorcinol, 4-aminobenzoic acid, 4-hydroxybenzoic acid, 4-aminophenol, 1,4-phenylenediamine, 4,4'-biphenol, 4,4'-biphenyidicarboxylic acid, 6-hydroxy-2-naphthoic acid, 2,6-naphthalenedicarboxylic acid, and 2,6-dihydroxynaphthalene. Preferred LCP's include the polymers that are sold under the VECTRA® trademark, most of which comprise monomer units derived from 6-hydroxy-2-naphthoic acid (HNA) and 4-hydroxybenzoic acid (HBA) in their structure. Particularly preferred polymers from the VECTRA products are the VECTRA A polymers, made up of about 73% HBA monomer units and 27% HNA monomer units, and VECTRA E products, which contain HBA, HNA, 4,4'-biphenol (BP) and terephthalic acid (TA) as described in U.S. Pat. No. 4,473,682, incorporated herein by reference. The polyesteramide comprising HBA, HNA, BP, TA and 4-aminophenol, taught in U.S. Pat. No. 5,204,443, which is also incorporated herein by reference, is also useful with these adhesives. All of these products are available from Hoechst Technical Polymers, Summit, N.J. Another LCP which may be used in multilayer films using the adhesives taught herein is disclosed in U.S. Pat. No. 5,656,714, incorporated herein by reference, and comprises monomer units derived from HBA, HNA, BP, TA, and resorcinol. LCP's comprising BP, HBA, TA, and other optional monomers are available from Amoco Chemicals under the XYDAR® trademark. LCP's containing 2,6-naphthalenedicarboxylic acid, BP, and other monomer units are also available from DuPont. Films made from all of these polymers can be made into multilayer films and polymer blends using the adhesives and methods taught herein.

The following LCP's were tested herein for the purpose of obtaining multilayer films:

(1) VECTRA® A film, comprised of monomer units derived from HBA and HNA in a ratio of about 73:27, and having a melting temperature of about 280° C.

(2) VECTRA® B Resin, which is a polyesteramide comprising monomer units derived from HNA, TA, and 4-aminophenol (see U.S. Pat. No. 4,330,457) and which has a melting temperature of about 280° C.

(3) VECTRA® L Resin, which is a liquid crystalline poly(esteramide) comprised of monomer units derived from HBA, HNA, BP, TA and 4-aminophenol in accordance with U.S. Pat. No. 5,204,443. This resin has a melting temperature of 302° C.

(4) An experimental LCP polyester, comprising monomer units derived from HBA, HNA, HQ, and TA, referred to hereinafter as Experimental Polymer 1. It has a melting temperature of about 220° C.

(5) An experimental LCP polyester film that has been modified to have better adhesion by including monomer units that have sulfonate groups. It comprises monomer units made from about 73 mole % HBA, about 27 mole % HNA, and the sodium salt of 5-sulfoisophthalic acid (0.2 mole %). It has a melting point of 270° C., and is further described in U.S. Pat. No. 5,227,456 which is incorporated herein by reference. It is referred to hereafter as Experimental Polymer 2.

(6) An experimental liquid crystalline polymer that comprises monomer units derived from HBA, HNA, BP, TA, and resorcinol, as described in U.S. Pat. No. 5,656,714. It is referred to hereafter as Experimental Polymer 3.

Some of the polymers, e.g. VECTRA® A, B, and L resins are available commercially as glass-filled polymer resins or as films. VECTRA® A resin is available as fiber, film, or filled resin.

The polyethylene films to which the LCP films are bound by using the adhesives disclosed herein are all commercially available materials. Polyethylene is a commercially available resin that is widely used in various fabricated products, including films and sheets. The films (and sheets) can either be purchased as films or sheets or made from polyethylene resin. Several different kinds of polyethylene are commercially available. These differ in such properties as density, molecular weight, degree of branching, and processability. These include low density polyethylene, linear low density polyethylene, very low density polyethylene and high density polyethylene. All of these polyethylene materials may be made into film or sheet and bound to an LCP film or sheet.

The types of adhesives that are useful in this invention are all commercially available and are described in more detail below.

Ethylene-glycidly methacrylate copolymer

The particular sample tested was LOTADER™ AX8840, which is a copolymer of ethylene and glycidyl methacrylate and is sold by Elf Atochem North America, Inc., Philadelphia, Pa. An adhesive with a similar composition was also obtained from Aldrich Chemical Co. and behaved similarly. The glycidyl methacrylate comonomer units are present at a level of about 8 weight %. The glycidyl methacrylate monomer units can be present at any level at which the polymer is tractable, but preferably are in the range of about 4 weight % to about 20 weight %. The melting point of the LOTADER AX 8840 is about 228° F. by DSC, the Vicat softening point, measured by ASTM Test Method D1525, using a 1 kg load, is 189° F., and the melt index, measured at 190° C. by ASTM Method D1238 under a 1 kg weight, is 5 gm/10 min.

Ethylene-methyl acrylate-glycidyl Methacrylate Terpolymer

The polymer sample tested was LOTADER™ AX8900, supplied by Elf Atochem North America, Inc. This polymer contains about 23.5 weight % methyl acrylate monomer units and about 7.25 weight % glycidyl methacrylate monomer units. The glycidyl methacrylate and methyl acrylate units can be present over a wide range of amounts, but preferably the glycidyl methacrylate units are present at a level in the range of about 4 weight % to about 20 weight %. The methyl acrylate can be included at any level but preferably not at a level higher than about 50 weight %. The terpolymer has a melting point of about 149° F. by DSC and a vicat softening point of <100° F., measured by ASTM Test Method D1525 under a 1 kg load. The melt index, measured at 190° C. under a 2.16 kg load using ASTM Method D1238, is 6.5 gm/10 min.

Ethylene-vinyl acetate copolymer

Certain ethylene-vinyl acetate copolymers are good adhesives for LCP/polyethylene multilayer structures. For example, A-C® 400 ethylene-vinyl acetate copolymer from Allied Signal exhibits good adhesion to high density polyethylene (HDPE) but relatively poor adhesion to LCP films. On the other hand, PLEXAR® PX 114 ethylene-vinyl acetate copolymer from Quantum Chemical Company exhibits excellent adhesion for both LCP films and HDPE film. PLEXAR® PX 114 contains 13% vinyl acetate groups in its structure, whereas the A-C® 400 adhesive contains only 9% vinyl acetate groups. The higher vinyl acetate content (greater than 9% of the units, preferably greater than 11%) appears important in achieving adhesion to both polyethylene and LCP.

Melt viscosity of the adhesive is also important. Melt viscosity is a measure of molecular weight. If the melt viscosity is too low, the adhesive "sticks" to HDPE and LCP, but fails because the adhesive film itself is not cohesive enough. Thus the adhesive layer itself fails before the adhesive bond to LCP or HDPE fails. Thus A-C® 400, which has a melt viscosity too low to measure at 200° C. using a laboratory capillary rheometer, has such a low molecular weight that multilayer films in which it is used fail because of cohesive failure of the A-C® 400 layer. PLEXAR® PX 114 has a much higher molecular weight, as indicated by its melt viscosity of 2400 poise @ 1000 sec$^{-1}$ and 200° C. This indicates that a melt viscosity of at least 1000 poise @ 1000 sec$^{-1}$ and 200° C., and preferably at least 1500 poise under the same conditions, is needed to achieve good adhesion.

Melting point is another useful measure of the polymer composition. A-C® 400 has a melting point of about 60° C., whereas PLEXAR® PX 114 has melting points of about 94° and 123° C. A melting point of at least 75° C. is believed desirable for achieving good adhesion.

Ethylene-acrylic acid copolymer

Ethylene-acrylic acid copolymer is an excellent adhesive for making LCP—polyethylene multilayer films. The particular adhesive tested was A-C® 5120, from Allied Signal, which has a melting point of 62° C., and which performed well as an adhesive. A-C® 5120 has a Mettler Drop Point of 92° C. by ASTM Test Method D-3954; a hardness of 8.0 dmm by ASTM Test Method D-5; a density of 0.94 g/cc by ASTM Test Method D-1 505; a viscosity of 650 cps at 140° C., using a Brookfield viscometer; and an Acid Number of 120 mg KOH/g. Ethylene-acrylic acid copolymers suitable for use as an adhesive in making multilayer films should have similar properties, e.g. a viscosity of at least 500 cps at 140° C.; a hardness of at least 4.0 dmm; a Mettler drop point of at least 76° C.; and a comparable acrylic acid level, measured as an acid number of at least 100 mg KOH/g.

Polyolefin Blend

MACROMELT® Q5353 hot melt adhesive from Henkel Corporation turned out to be an excellent hot-melt adhesive for combining LCP films with polyethylene, polypropylene, polycarbonate, poly(ethylenea terephthalate) and poly(phenylene sulfide). The material appears to be a mixture of poly(α-olefins), consisting mainly of isotactic polypropylene and a polymer of a second lower α-olefin, perhaps atactic poly(1-butene), combined with a small amount of one or more higher poly(α-olefin) oligomers. The material exhibits a trace of carbonyl absorption under infrared analysis, and traces of aromatic absorptions by $C^{13}$-NMR analysis, but both are at levels of <3 mole %. The material is described in U.S. Pat. No. 5,512,625, which is incorporated herein by reference. The patent indicates that the polyolefin blend comprises an oligomer of an α-olefin with at least 8 carbon atoms in the monomer blended with a substantially amorphous poly(α-olefin) (perhaps atactic poly(1-butene)) and a substantially crystalline poly(α-olefin) (e.g. isotactic polypropylene).

Methods of Making Laminated Films and Sheets

The films and sheets are most conveniently made on a large scale by a conventional co-extrusion process in which the various film and adhesive layers are combined within the die head in the molten phase and extruded through a single slit, resulting in a multilayer film. In coextrusion processes, the adhesives preferably have higher melt viscosities than adhesives used for compression bonding. The viscosities of the components in a coextrusion process should have comparable melt viscosities (within a factor of 10).

On a laboratory scale, samples of multilayer films and sheets are made by compression molding, i.e. by heating stacked layers of the films and sheets and the adhesive layers, which are also in film or sheet form, under pressure to a temperature above the melting point of the LCP and adhesive layers. Films and sheets that are to be laminated together generally have a thickness in the range of about 0.01 mm to about 10 mm.

The adhesives identified above are also suitable for use as compatibilizers in making polymer blends. The blends are made by conventional blending methods, most typically by feeding the polymers and adhesives simultaneously into an extruder and mixing them in the melt phase in the extruder. Twin screw extruders are generally preferred for making blends.

The practice of the invention is shown by the following examples, which are illustrative only and should not be viewed as limiting the scope of the invention.

EXAMPLES

Example 1

Synthesis of LCPs

The LCPs used in evaluating multilayer films were either commercially available or were made by methods similar to the method shown below for making a copolymer of about 73 mole % 4-hydroxybenzoic acid (HBA), 27% of 6-hydroxy-2-naphthoic acid (HNA), and 0.2% of 5-sulfoisophthalic acid (SSI).

A pilot scale reactor was charged with 150.4 lbs (493.8 moles) of HBA, 75.8 lbs (182.7 moles) of HNA, and 0.8 lbs (1.35 moles) of SSI. Following vacuum deaeration, acetic anhydride (154.3 lbs, 1.0 mole % excess) was charged into the reactor and the water in the cold finger condenser was turned on as an aid to control reflux. The mixture was then stirred at 45 rpm and heated according to the following temperature profile:

| Stage | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| Final Temp (° C.) | 25 | 125 | 130 | 140 | 150 | 200 | 210 | 220 | 335 | 340 | 340 | 340 |
| Time (min.) | 1 | 50 | 10 | 40 | 20 | 45 | 5 | 7 | 115 | 10 | 10 | 360 |

After 7 to 8 hours the final temperature of 340° C. was reached. The water in the cold finger was turned off when the reaction temperature reached 300° C. After holding at 340° C. for 30 minutes, the vacuum stripping cycle was started during stage 12, and the stirring rate was reduced to 25 rpm. Full vacuum (7 mm Hg) was typically reached in 45 minutes. The mixture was is heated at 340° C. under full vacuum for an additional period of time to obtain the targeted stirring torque (base torque+700 in-lbs). After reaching the target torque the vacuum was broken by allowing nitrogen back into the reactor. The polymer was held at 340° C. while it was extruded from the reactor through a 5 hole die with nitrogen pressure over 35–45 minutes. The polymer strands were cooled in a water trough and then sent through a chopper, and the reactor chip was collected in a drum. Samples for polymer evaluation were collected at the beginning, middle, and end of the extrusion. The polymer was tumble dried, sieved, and weighed. The typical yield was 154 pounds (77%).

Example 2
Sample Preparation and Testing

LCP films were prepared by extruding the LCP in the molten phase through a die with vacuum applied at the venting port to remove volatiles.

The extrusion line was a conventional pilot scale extrusion line, producing 2–5 mil thick LCP films. High density polyethylene ("HDPE") and the adhesives were each made into films with dimensions of 16.5 cm×21.5 cm×1–1.5 mm thick by compression molding on a Wabash Compressor at a temperature about 20° C. above the melting point of the polymer.

For screening purposes, structures having two layers, either of LCP and adhesive or of HDPE and adhesive, are first made by heating the LCP or HDPE film on fluoropolymer coated aluminum foil in an oven to a temperature about 20° C. above the melting temperature. After the polymer softens, the adhesive layer is placed on top, and then covered with a fluoropolymer coated aluminum release sheet and a 2-pound steel weight. The pressure of the weight is maintained for about 5 minutes, and then the heat and pressure are removed. The adhesive bonding of the HDPE or LCP to the adhesive is measured qualitatively as follows. The free ends of the two film layers in the test piece are grasped by hand and pulled apart. The force needed to pull them apart is rated qualitatively on a scale of "1" to "4", where "1" means that adhesion is poor, with no force being required to separate the layers, and "4" means excellent adhesion (the strips cannot be separated by hand). If the LCP and HDPE bond well to the same adhesive (i.e. are rated "3" or "4" using the same adhesive) then they are expected to also attach to each other using the same adhesive to form a multilayer film. The results of these tests are presented in Table 1. Results with adhesives that did not give good adhesion are not included in Table 1.

Three layer films were made in some of the cases where it was predicted that good quality three-layer films can be made, based on the screening tests described above. Since good three-layer films were obtained in agreement with the predictions resulting from the screening tests, only a portion of the three layer films that were expected to have good adhesion were actually made. Three layer films are made by the following method.

A test strip of the LCP (about 2.54 cm×15.24 cm×2 mil) is placed on a fluoropolymer coated aluminum release sheet in an oven at a temperature approximately 30° C. above the softening point of the LCP. When visual inspection indicates that the polymer has softened (typically 2–3 minutes), a 2.54 cm test strip of the candidate adhesive is placed on top of the softened polymer. An aluminum release sheet is placed on top of the adhesive and a 2 lb steel weight is set on top of the release sheet. After approximately 5 minutes the material is removed from the oven and allowed to cool to room temperature and the aluminum release sheet is removed. The HDPE layer is then applied by placing the LCP/adhesive structure within a 12.7 cm steel frame on top of an aluminum release sheet lying on the platen of a hot press machine set approximately 20° C. above the melting temperature of the HDPE. A 2.54 cm strip of HDPE film is placed on top of the adhesive, and fluoropolymer coated aluminum release sheet is placed on top of the material. Two tons of pressure is applied for 10 minutes and then the pressure is released. The material is removed from the platen and allowed to cool to room temperature.

Quantitative measurements of the strengths of the bonds between the LCP and HDPE are carried out using a modified Simple Lap Joint Test, as set forth in ASTM test method D 1002-94. The test is really designed for bonded metal specimens, but is suitable for comparative testing of bonded polymer films. Samples of 4 mm thick multilayer films are prepared with ½" of overlap for testing. The films are pulled apart using an Instron tensile tester with an angle of peel of 0°.

As a control, the samples made above were compared with a sample of ethylene-vinyl alcohol copolymer film (EVOH) bonded to high density polyethylene (HDPE) using ADMER® 458A adhesive. This is used commercially for making automobile gas tanks. This control and the samples made in accordance with this invention exhibited similar levels of adhesion between layers.

For example, a sample of VECTRA® A resin film laminated to HDPE using PLEXAR® PX 114 showed a maximum load of 143 pounds using the lap shear test described above. For comparison, EVOH film bound to HDPE showed a maximum load of 130 pounds using the same test. Thus, the LCP/HDPE multilayer film compares favorably with a commercial EVOH/HDPE multilayer film which is used commercially.

Example 3
Coextrusion of a Multilayer Film:

A few multilayer films were coextruded using a pilot line designed for making multilayer fims. The pilot line had three extruders with screw diameters of 3.5, 2.0 and 1.5 inches. The polymeric material having the greatest total thickness in the coextruded film is generally extruded with the extruder having the largest screw diameter. The molten polymer streams were delivered to the feed block in channels in which the streams were divided and then combined again so that they emerged from the die lips to make a multilayer film, which then impinged on a chill roll and was finally is taken up on a roll winder. During the extrusion the overall thickness of the extruded film was continuously monitored by a beta gauge. By means of this equipment, several multilayer films were made. One example is the following 5-layer structure:

High density polyethylene ("HDPE"), 3 mils

Adhesive, 1 mil

LCP, 2 mils

Adhesive 1 mil

HDPE, 3 mils

The LCP was Experimental Polymer 3, which is a copolymer of 4-hydroxybenzoic acid, 6-hydroxy-2-napthoic acid, terepthalic acid, 4,4'-biphenol, and resorcinol, as described in U.S. Pat. No. 5,656,714. The HDPE was either type 1224 or type 7208 from Fina Oil and Chemical Co, Houston, Tex. The former has a high load melt index (190° C., 21.6 kg) of 6.0 g/10 min.; that of the latter is 23 g/10 min. The adhesive was LOTADER AX8840 (polyethylene-co-glycidyl methacrylate) from Elf Atochem North America, Inc., Philadelphia, Pa.

Example 4
Adhesion of Ethylene-vinyl acetate copolymer to HDPE and LCP's:

Two different commercial materials were tested, PLEXAR® PX 114 copolymer, supplied by Quantum Chemical, and A-C® 400 copolymer, supplied by Allied Signal. The properties and compositions of the adhesives are summarized in the Detailed Description section. Both A-C® 400 and PLEXAR® PX 114 were rated as bonding well to HDPE (rating of 4 on scale of 1–4 by the qualitative test described earlier). The two adhesives showed variable results in bonding to LCP's as shown in Table 1.

In Table 1, a strength of 4 is good, and 3 is less good, but acceptable. Ratings of 1 and 2 are not acceptable. It can be seen that A-C® 400 is not a very good adhesive for LCP's, but that PLEXAR® PX 114 is good or at least acceptable in all LCP's that were tested. This was confirmed by making a multilayer film of HDPE and VECTRA® A film using PLEXAR® PX 114 as is adhesive, as described above. This multilayer film was as good in terms of adhesive strength between the layers as was the control.

The reason that the A-C® 400 adhesive was poor was apparently because the adhesive layer did not have adequate strength to form a cohesive layer. The A-C® 400 film layers appeared to fail because of cohesive failure.

Example 5
Adhesion of Polyolefin Blend to HDPE and LCP's:

MACROMELT® Q5353 polyolefin blend showed good adhesion to all of the conventional polymers that were tested (HDPE, polypropylene, polycarbonate, poly(ethylene terephthalate), and poly(phenylene sulfide)), achieving a score of 4 with all five polymer films using the qualitative test method for adhesion. It also adhered well (score of 4) to all of the LCP's that were tested, except VECTRA® B resin, where it still had acceptable adhesion (score of 3). It is thus the one adhesive that appears to be good for making multilayer films of polycarbonate, polyethylene, polypropylene, poly(ethylene terephthalate), poly(phenylene sulfide), and LCP's in any order or combination. It is truly surprising that this material could be a "universal adhesive" for multilayer films of conventional polymers and LCP's.

Compatibilization Tests

The adhesives for making multilayer films also act as compatibilizers for making blends of the same polymers that the adhesives bind together. An example of a polypropylene/LCP blend is illustrated below. Polyethylene/LCP blends perform similarly, using the adhesives disclosed herein as compatibilizers. A blend of a fiber grade polypropylene (Montell type KY 6100) with Experimental Polymer 1 was made and evaluated. The blend contained 10% by weight LCP and 90% by weight polypropylene. In addition, an antioxidant (NAUGUARD™ 10 from Ciba-Geigy) and an additive which is a compatibilizer for some combinations of polymers but is not an effective compatibilizer for polypropylene and LCP's (NUCREL™ 0903 ethylene-methacrylic acid copolymer from DuPont) were included at levels of 0.2% and 0.5% by weight respectively for all the samples that were tested. The combinations were compounded with compatibilizers that are suitable for polypropylene and LCP's by a single or double pass through an extruder, The compounds were cast into film. The films that included these compatibilizers had a better, more uniform appearance than the films that did not include the compatibilizers.

The compounds were also made into films by extrusion, and the tensile properties were measured by ASTM method D1876. The results for the control (without the compatibilizer) and the two samples with the compatibilizer follow:

(1) No compatibilizer—tensile modulus, 1.44 GPa; yield stress, 22.5 MPa;

(2) 1% by weight of a 50:50 blend of POLYBOND® 3002 and MACROMELT® 6239—tensile modulus, 1.69 GPa; yield stress, 29.5 MPa;

(3) 1% by weight of a 40:60 blend of POLYBOND® 3002 and MACROMELT® 6239—tensile modulus, 1.85 GPa; yield stress, 29.9 MPa.

Thus, the blends that include the compatibilizers disclosed above have improved appearance and improved tensile properties compared with blends without the compatibilizers. This applies to other combinations than just the LCP/polypropylene example above, including LCP's and polyethylene.

It is to be understood that the above-described embodiments of the invention are illustrative only and that modification throughout may occur to one skilled in the art. Accordingly this invention is not to be regarded as limited to the embodiments disclosed herein.

TABLE 1

Bond Strength[1] Between LCP's Adhesives, and HDPE

| LCP | LOTADER ™ AX 8840 | LOTADER ™ AX 8900 | A-C ® 400 | PLEXAR ® P 114 | A-C ® 5120 | MACROMELT ® Q5353 |
|---|---|---|---|---|---|---|
| VECTRA ® A | 4 | 4 | 2 | 4 | 3 | 4 |
| VECTRA ® B | 4 | 4 | 2 | 4 | 4 | 3 |
| VECTRA ® L | 4 | 4 | 2 | 3 | 4 | 4 |
| EXPERIMENTAL POLYMER 1 | 4 | 2 | 2 | 3 | 4 | 4 |
| EXPERIMENTAL POLYMER 2 | 4 | 4 | 3 | 4 | 4 | 4 |
| EXPERIMENTAL POLYMER 3 | 4 | 4 | — | 3 | 3 | 4 |
| HDPE | 4 | 4 | 4 | 4 | 4 | 4 |

[1]Scale of 1–4; 4 is good, 3 is acceptable, and 1 and 2 are not acceptable.

We claim:

1. A method of laminating a thermotropic liquid crystalline polymer film and a polyethylene film together, wherein said thermotropic liquid crystalline polymer film and said polyethylene film are heated under a compressive force with a hot melt adhesive between said thermotropic liquid crystalline polymer film and said polyethylene film to a temperature above the melting points of said thermotropic liquid crystalline polymer film, said polyethylene film, and said hot melt adhesive for a time sufficient to melt said hot melt adhesive and bind said polyethylene film and said thermotropic liquid crystalline polymer film to one another to yield a laminated film, wherein said hot melt adhesive is a polyolefin blend comprising isotactic polypropylene, a substantially amorphous second poly(α-olefin), and an oligomer of a third α-olefin which has at least 8 carbon atoms in the α-olefin monomer.

2. The method as recited in claim 1, wherein said hot melt adhesive is in the form of a film.

3. The method as recited in claim 1, wherein said thermotropic liquid crystalline polymer film and said polyethylene film each have a thickness in the range of about 0.01 mm to about 10 mm.

4. The method as recited in claim 1, wherein said hot melt adhesive is a polyolefin blend marketed as MACROMELT® Q5353.

5. The method as recited in claim 1, wherein said polyethylene film comprises high density polyethylene.

6. The method as recited in claim 1, wherein said thermotropic liquid crystalline polymer film comprises a polymer derived from one or more monomers selected from the group consisting of terephthalic acid, isophthalic acid, 1,4-hydroquinone, resorcinol, 4-aminobenzoic acid, 4-hydroxybenzoic acid, 4-aminophenol, 1,4-phenylenediamine, 4,4'-biphenol, 4,4'-biphenyldicarboxylic acid, 6-hydroxy-2-naphthoic acid, 2,6-naphthalenedicarboxylic acid, and 2,6-dihydroxynaphthalene.

7. The method as recited in claim 1, wherein said thermotropic liquid crystalline polymer film is made from a thermotropic liquid crystalline polymer selected from the group consisting of (1) a polymer that consists essentially of monomer units derived from 4-hydroxybenzoic acid and 6-hydroxy-2-naphthoic acid; (2) a polymer that consists essentially of monomer units derived from 6-hydroxy-2-naphthoic acid, terephthalic acid, and 4-aminophenol; (3) a polymer that consists essentially of monomer units derived from 4-hydroxybenzoic acid, 6-hydroxy-2-naphthoic acid, 4,4'-biphenol, terephthalic acid, and 4-aminophenol; (4) a polymer that consists essentially of monomer units derived from 4-hydroxybenzoic acid, 6-hydroxy-2-naphthoic acid, hydroquinone, and terephthalic acid; (5) a polymer that consists essentially of monomer units derived from 4-hydroxybenzoic acid, 6-hydroxy-2-naphthoic acid, and 5-sulfoisophthalic acid; (6) a polymer that consists essentially of monomer units derived from 4-hydroxybenzoic acid, 6-hydroxy-2-naphthoic acid, 4,4'-biphenol, terephthalic acid, and resorcinol; and (7) a polymer that consists essentially of monomer units derived from 4-hydroxybenzoic acid, 6-hydroxy-2-naphthoic acid, terephthalic acid, and 4,4'-biphenol.

8. A method of making a multilayer film that comprises a polyethylene layer and a thermotropic liquid crystalline polymer layer bound to one another, wherein said thermotropic liquid crystalline polymer, said polyethylene, and a hot melt adhesive are combined in the molten state in a die head and extruded through a slit to yield a multilayer film, wherein said hot melt adhesive is a polyolefin blend comprising isotactic polypropylene, a substantially amorphous second poly($\alpha$-olefin), and an oligomer of a third $\alpha$-olefin which has at least 8 carbon atoms in the $\alpha$-olefin monomer.

9. The method as recited in claim 8, wherein said polyethylene layer and said thermotropic liquid crystalline polymer layer each have a thickness in the range of about 0.01 mm to about 10 mm.

10. The method as recited in claim 8, wherein said hot melt adhesive is a polyolefin blend marketed as MACROMELT® Q5353.

11. The method as recited in claim 8, wherein said polyethylene film comprises high density polyethylene.

12. The method as recited in claim 8, wherein said thermotropic liquid crystalline polymer film comprises a polymer derived from one or more monomers selected from the group consisting of terephthalic acid, isophthalic acid, 1,4-hydroquinone, resorcinol, 4-aminobenzoic acid, 4-hydroxybenzoic acid, 4-aminophenol, 1,4-phenylenediamine, 4,4'-biphenol, 4,4'-biphenyldicarboxylic acid, 6-hydroxy-2-naphthoic acid, 2,6-naphthalenedicaboxylic acid, and 2,6-dihydroxynaphthalene.

13. The method as recited in claim 8, wherein said thermotropic liquid crystalline polymer film is made from a thermotropic liquid crystalline polymer selected from the group consisting of (1) a polymer that consists essentially of monomer units derived from 4-hydroxybenzoic acid and 6-hydroxy-2-naphthoic acid; (2) a polymer that consists essentially of monomer units derived from 6-hydroxy-2-naphthoic acid, terephthalic acid, and 4-aminophenol; (3) a polymer that consists essentially of monomer units derived from 4-hydroxybenzoic acid, 6-hydroxy-2-naphthoic acid, 4,4'-biphenol, terephthalic acid, and 4-aminophenol; (4) a polymer that consists essentially of monomer units derived from 4-hydroxybenzoic acid, 6-hydroxy-2-naphthoic acid, hydroquinone, and terephthalic acid; (5) a polymer that consists essentially of monomer units derived from 4-hydroxybenzoic acid, 6-hydroxy-2-naphthoic acid, and 5-sulfoisophthalic acid; (6) a polymer that consists essentially of monomer units derived from 4-hydroxybenzoic acid, 6-hydroxy-2-naphthoic acid, 4,4'-biphenol, terephthalic acid, and resorcinol; and (7) a polymer that consists essentially of monomer units derived from 4-hydroxybenzoic acid, 6-hydroxy-2-naphthoic acid, 4,4'-biphenol and terephthalic acid.

\* \* \* \* \*